Nov. 29, 1966  JURO KUBO  3,288,633
METHOD OF PRODUCING NON-FIRED DECORATIVE GLAZE
COATINGS ON METAL SURFACES
Filed Dec. 17, 1962
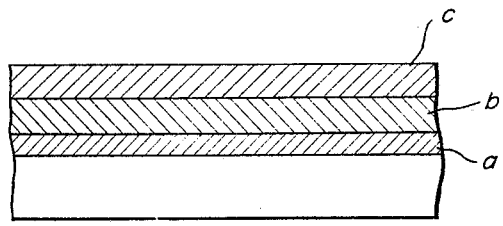
JURO KUBO
INVENTOR.
BY Anderson & Baranick 3,288,633
METHOD OF PRODUCING NON-FIRED DECORATIVE GLAZE COATINGS ON METAL SURFACES
Juro Kubo, 11 Higashi-Ashiyacho, Ashiya-shi, Japan
Filed Dec. 17, 1962, Ser. No. 244,984
2 Claims. (Cl. 117—70)

This invention relates to applying cold glaze coatings on metal surfaces. More particularly, it concerns the method of producing non-fired decorative glaze coatings with strong adhesion on metal surfaces.

To apply cold glaze material to surfaces of concrete, cement, or like surfaces is known, for example, in U.S. Patent 2,882,180. However, applying such known techniques on metal surfaces usually result in cracking and loosening of the coated material due to weak adherence of the cold glaze material, not to speak of its poor gloss of the glaze surface.

It is an object of the present invention to provide a method for producing a metal based decorative surface with superior adhesion strength and excellent gloss.

It is another object of the present invention to provide and develop the uses of metallic materials having hard, glossy, impact-resistant and stain-resistant surfaces.

The accompanying drawing shows one mode of the present invention, which comprises applying the undermentioned (a), (b) and (c) layers in such order, on a steel plate.

(a) An adhesive layer containing, e.g., epoxy resin and silica sand or quartz particles.

(b) An elastic and water proof layer containing, e.g., a polyisobutylene resin and quartz particles.

(c) A cold glaze layer containing, e.g., pigments, auxiliaries, etc.

Here it should be noted that layer (c) should be applied immediately before the hardening of layer (b).

The metals employed in this invention may be steel, aluminum, copper, etc., or any of their alloys and should be free of oxides on the surface. And therefore, its surface should be polished by sand blasting or like process and whatever oils and stains thereon should also be removed by known means.

Layer (a) applied directly on the surface contains a resin, which may either be thermoplastic or thermosetting, preferably the latter, examples being epoxy resin and sulfonamide resin. Solvents may be used when required. The resins are employed in the following formulations (by volume):

| Sulfonamide resin | 1 | Epoxy resin | 1 | 1 |
| Thinner | 1 | Methanol | 1 | |
| | | Curing agent | 1 | 1 |
| | | Toluene | 1 | |

Non-permeable and elastic materials used in the elastic layer (b) are thermoplastic resin and include polyisobutylene, polyvinyl chloride, polyurethane, polyvinyl acetate, polystyrene, polyacrylate, etc. Known solvents and softening agents may be added as required.

The silica sand or quartz for incorporation into the resin or into the elastic layer should preferably be of grain sizes less than 0.1 mm.

The quartz has brilliant surfaces to improve luster of undercoating, is effectively held in the binder because of its hardness and angularity, and acts to inhibit peeling of cracking due to difference in thermal expanding coefficient between cement and metals. Heretofore, the luster of undercoating has been lost because curing removed the moisture responsible for the luster, but the use of quartz in the present invention obviates this result.

The present invention is conducted under room temperature. To a metal surface polished thoroughly, a resin solution containing silica sand is applied thereto. Brushing is preferred to spraying, but electrostatic coating may be employed when and where practical. Subsequently, the quartz-coating elastic and non-permeable layer is applied and finally the cold glaze material is applied just before the former layer hardens.

One example of the process under this invention is indicated hereunder. However, since obvious modifications will be conceivable by those in the art, this invention is not limited to the exemplifications given in this specification.

An epoxy resin adhesive containing silica sand is applied on the surface of a steel plate which has previously received sufficient treatment to remove rust, stains and oils. Then an isobutylene solution, containing homogeneously dispersed quartz particles of about 0.1 mm. particle size, is applied evenly on the epoxy mixture layer. As soon as said isobutylene layer has hardened, excess quartz particles appearing on the surface of the layer are removed by compressed air blasts. Subsequently, a cold glaze layer, typically prepared by mixing Portland cement, pigments, dry quartz flour of not more than 0.05 mm. in particle size and known additives which would enable the mixture to be applicable by known spraying devices, is applied thereon. The cold glaze is finally applied promptly when the penultimate adhesive layer has hardened.

What I claim is:
1. A process for manufacturing a cold glazed metal object cleaned so as to be substantially free of oxides, said process comprising the steps of;
 applying on a surface of a metal object a first layer of quartz powder of grain size less than 0.1 mm. admixed with a sulfonamide or epoxy resin, the quartz powder being in an amount of from about ⅓ to ¼ of the volume of said resin;
 applying on said first layer a second layer of quartz powder admixed with about an equal volume of a resin selected from the group consisting of polyisobutylene, polyvinyl chloride, polyurethane, polyvinyl acetate, polystyrene, and polyacrylate; and
 applying on said second layer before the second layer hardens a cold glaze layer.

2. A process as defined in claim 1 wherein said layers are applied at room temperature.

References Cited by the Examiner
UNITED STATES PATENTS

| 1,873,945 | 8/1932 | Kraenzlein et al. | 117—75 |
| 2,774,681 | 12/1956 | Huppert et al. | 117—70 X |
| 2,883,180 | 4/1959 | Moulton | 267—35 |
| 2,895,389 | 7/1959 | Nagin | 117—75 X |
| 3,140,195 | 7/1964 | Nagel | 117—75 X |
| 3,147,546 | 9/1964 | Bowman et al. | 117—75 X |

ALFRED L. LEAVITT, *Primary Examiner.*

RICHARD D. NEVIUS, *Examiner.*

W. L. SOFFIAN, *Assistant Examiner.*